United States Patent
Garcia Ruiz et al.

(10) Patent No.: US 12,313,142 B2
(45) Date of Patent: May 27, 2025

(54) SHOCK ABSORBER WITH MECHANICAL STOP FOR TORQUE CONVERTER

(71) Applicant: VALEO KAPEC CO., LTD., Daegu (KR)

(72) Inventors: Caleb Garcia Ruiz, Daegu (KR); Juan Antonio Rivera Moreno, Daegu (KR)

(73) Assignee: VALEO KAPEC CO., LTD., Daegu (KR)

( * ) Notice: Subject to any disclaimer, the term of this patent is extended or adjusted under 35 U.S.C. 154(b) by 0 days.

(21) Appl. No.: 18/534,270

(22) Filed: Dec. 8, 2023

(65) Prior Publication Data

US 2024/0191774 A1    Jun. 13, 2024

(30) Foreign Application Priority Data

Dec. 8, 2022 (MX) .................... MX/a/2022/015708

(51) Int. Cl.
*F16F 15/121* (2006.01)
*F16F 15/10* (2006.01)

(52) U.S. Cl.
CPC .......... *F16F 15/10* (2013.01); *F16F 15/1217* (2013.01); *F16F 2228/10* (2013.01); *F16F 2232/04* (2013.01)

(58) Field of Classification Search
CPC ............ F16H 2045/007; F16F 15/1217; F16F 15/1213
See application file for complete search history.

(56) References Cited

U.S. PATENT DOCUMENTS

| | | | |
|---|---|---|---|
| 9,322,463 B2 | 4/2016 | Medellin et al. | |
| 11,326,678 B2* | 5/2022 | Velayudham | F16H 45/02 |
| 2009/0125202 A1* | 5/2009 | Swank | F16F 15/12353 |
| | | | 701/68 |
| 2012/0208648 A1* | 8/2012 | Takikawa | F16H 45/02 |
| | | | 464/68.8 |
| 2014/0209423 A1* | 7/2014 | Kawahara | F16F 15/134 |
| | | | 192/3.28 |
| 2015/0087429 A1* | 3/2015 | Verhoog | F16F 15/1217 |
| | | | 464/68.1 |
| 2015/0247550 A1* | 9/2015 | Tomiyama | F16F 15/12373 |
| | | | 464/68.92 |

(Continued)

FOREIGN PATENT DOCUMENTS

WO    WO 2021/078238 A1    4/2021

OTHER PUBLICATIONS

Extended European Search Report issued Apr. 25, 2024, in corresponding European Patent Application No. 23215247.0, 6 pages.

*Primary Examiner* — Ernesto A Suarez
*Assistant Examiner* — Lillian T Nguyen
(74) *Attorney, Agent, or Firm* — Oblon, McClelland, Maier & Neustadt, L.L.P.

(57) ABSTRACT

A shock absorber includes a mechanical stop for torque converter that prevents the exterior springs from reaching the solid length. The shock absorber with mechanical buffer stop includes a drive plate; at least one exterior spring; and a driven plate, the driven plate additionally includes at least one mechanical stop which is configured to make contact with the drive plate when the drive plate compresses each exterior spring, and each mechanical stop is located such that it prevents each exterior spring from reaching a solid-length condition.

6 Claims, 10 Drawing Sheets

(56) References Cited

U.S. PATENT DOCUMENTS

2015/0260257 A1* 9/2015 Jimenez Perez Mitre ................. F16F 15/1207
464/68.1
2016/0305525 A1* 10/2016 Depraete ................. F16H 45/02
2018/0335119 A1 11/2018 Cai et al.

* cited by examiner

SHOCK ABSORBER WITH MECHANICAL STOP FOR TORQUE CONVERTER

FIELD OF INVENTION

The present invention is related to torque converter, and more particularly is related to a shock absorber with mechanical stop for torque converter.

BACKGROUND OF THE INVENTION

Vibration is an intrinsic consequence of internal combustion engine operation. The ignition in gasoline or diesel and the inertia force on the engine pistons produce a fluctuating driving force on the crankshaft. If the gearbox were connected directly to the crankshaft, the engine vibrations would be transmitted directly to the transmission.

Therefore, a torque converter for automatic transmission systems is placed between the gearbox and the engine. When the brake is released and the accelerator is pressed, the engine accelerates and pumps a working fluid into the torque converter, which effectuates a hydraulic coupling to transfer the rotary power from the engine to the transmission of a vehicle, i.e. causing the transmission of power to the wheels.

The torque converter may comprise a casing, a pump, a turbine, a stator, a clutch, a shock absorber and a piston, among other things; the casing receives a rotational motion from the engine, the casing is assembled directly with the pump through a joint; the pump receives rotational motion from the casing and is configured to transfer that rotational motion to the turbine by means of a working fluid, which may be transmission oil; the turbine may transfer the rotational motion to the drive shaft directly, the vibrations generated by the engine are dissipated by the hydraulic coupling between the pump and the turbine; the shock absorber is configured to transfer the rotational motion to the vehicle's transmission when the clutch is activated; the clutch is configured to allow a direct coupling between the casing and the shock absorber when the pump and the turbine reach similar speeds, which causes a cessation in torque amplification, the clutch can be activated by the axial movement of the piston; and the piston is displaced axially by a pressure difference in the working fluid of the torque converter or by changing the direction of flow of the working fluid, and this axial displacement enables the activation of the clutch.

The shock absorber further comprises a drive plate that can receive rotational motion from the engine when the clutch is engaged, the drive plate sends the rotational motion through at least one exterior spring to a driven plate; at least one exterior spring including a first end that is connected to the drive plate, and a second end that is connected to a driven plate; and the driven plate receiving rotational motion from each exterior spring, wherein the driven plate is connected to the drive shaft.

There are different configurations for the exterior and interior springs of the shock absorber, as can be seen in FIG. 1, which shows different configurations for each exterior spring 1620' and/or interior spring 1623' of the shock absorber 1600' of the state of the art.

Figure 1A:
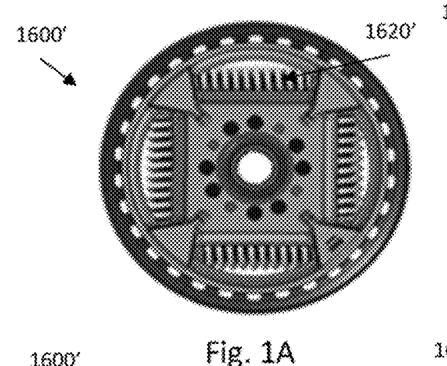
FIGS. 1A to 1E show a front elevation view of different configurations of the state of the art for exterior and/or interior springs of the shock absorber.
Figure 1B:
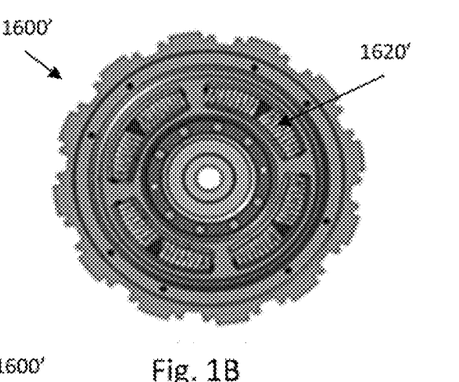
Figure 1C:
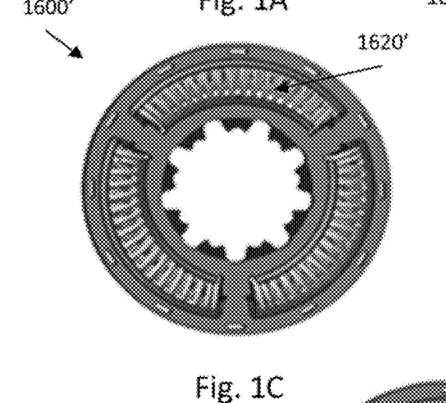
Figure 1D:
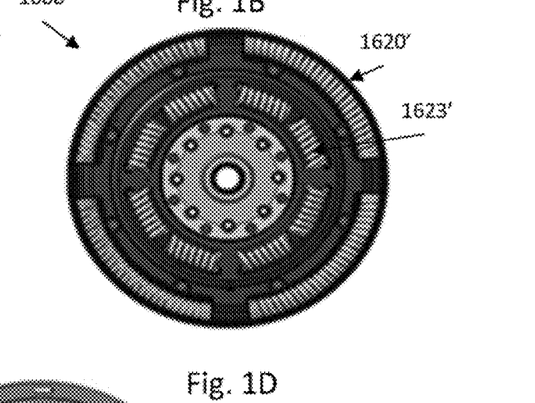
Figure 1E:
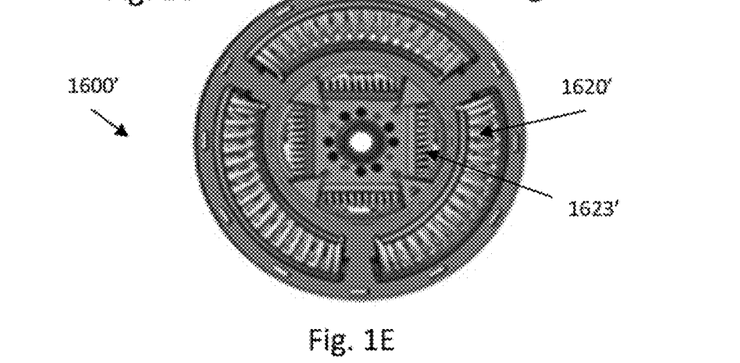
Figure 2:
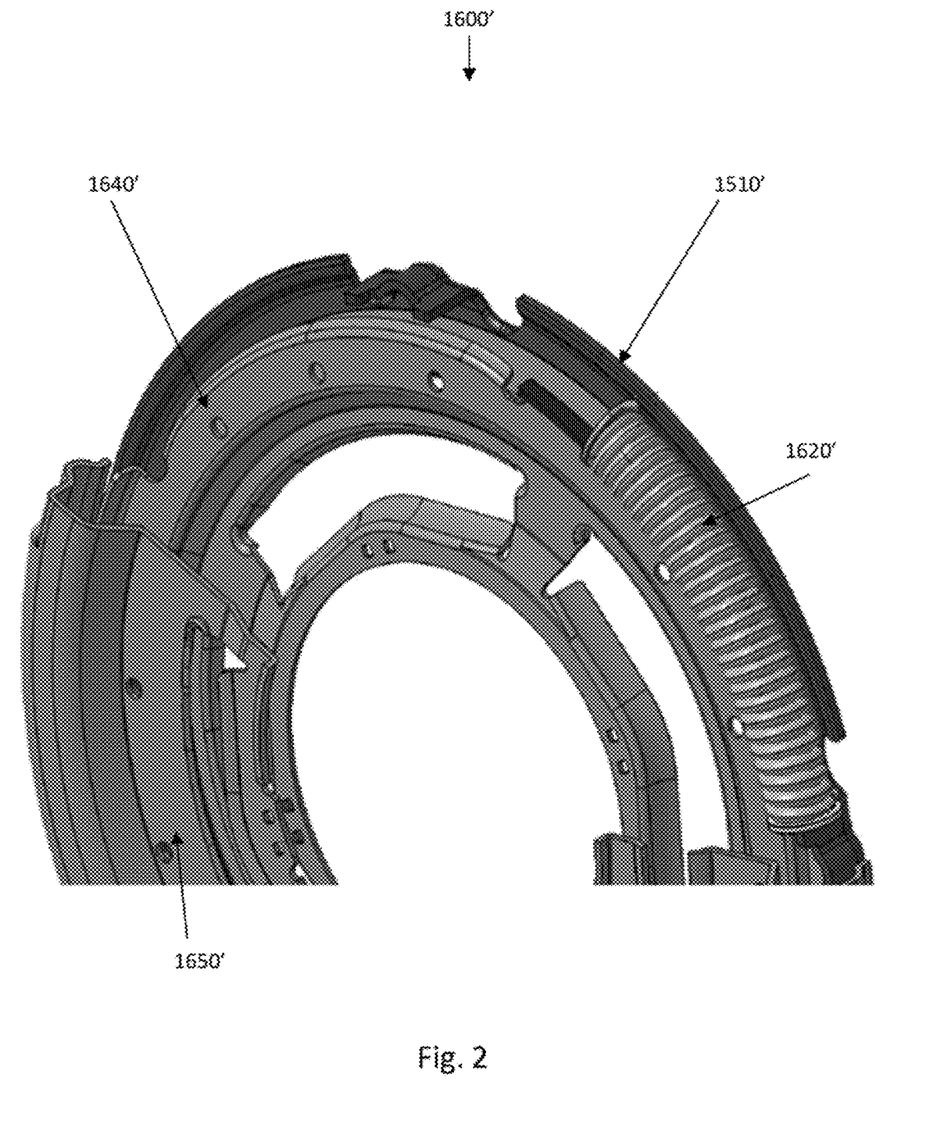
FIG. 2 shows a right front perspective view of a shock absorber of the state of the art.

The springs have a solid length, which is the distance at which the coils of the spring make contact with each other when compressed. It is necessary that the springs not reach their solid length in order to prevent them from breaking. However, the state-of-the-art shock absorber configurations do not in any way prevent the springs from reaching their solid length, as illustrated in FIG. 2, which shows a shock absorber 1600' of the state of the art comprising an impulse plate 1510', a piston side plate 1640', a turbine side plate 1650', and at least one exterior spring 1620', wherein the piston side plate 1640' and the turbine side plate 1650' do not possess any element to limit the compression of each exterior spring 1620'.

As a consequence of the above, we have sought to eliminate the disadvantages that the shock absorbers have for torque converters currently used, by developing a shock absorber with a mechanical stop for torque converters which, in addition to having a simplified manufacturing process, prevents the exterior springs from reaching the solid length.

OBJECTS OF THE INVENTION

Taking into account the defects of the prior art, it is an object of the present invention to provide a shock absorber with mechanical stop for torque converter that has a simplified manufacturing process.

It is another object of the present invention to provide a shock absorber with mechanical stop for torque converter which prevents the exterior springs from reaching the solid length without the need for additional exterior elements.

These and other objects are achieved by means of a shock absorber with mechanical stop for torque converter in accordance with the present invention.

BRIEF DESCRIPTION OF THE INVENTION

For this purpose, we have invented a shock absorber with mechanical stop for torque converter comprising a drive plate that receives a rotational motion; at least one exterior spring, wherein each exterior spring includes a first end that makes contact with the drive plate and a second end that makes contact with a driven plate; and the driven plate that receives the rotational motion from the drive plate through each exterior spring, the driven plate is configured to accommodate each exterior spring, and is connected to a drive shaft, wherein the shock absorber with mechanical stop is characterized in that the driven plate additionally comprises at least one mechanical stop which is configured to make contact with the drive plate when the drive plate compresses each exterior spring, and each mechanical stop is positioned such that it prevents each exterior spring from reaching a solid-length condition.

BRIEF DESCRIPTION OF THE DRAWINGS

The novel aspects which are considered characteristic of the present invention will be established distinctively in the appended claims. However, some embodiments, features and some objects and advantages of it will be better understood in the detailed description, when it is read in connection with the appended drawings, wherein:

DETAILED DESCRIPTION OF THE INVENTION

The present invention relates to a shock absorber with mechanical stop for torque converter which has a simplified manufacturing process and also prevents the exterior springs from reaching the solid length. To achieve that, a shock absorber with mechanical stop for torque converter is used, comprising a drive plate; at least one exterior spring; and a driven plate, wherein the driven plate additionally comprises at least one mechanical stop that is configured to make contact with the drive plate when the drive plate compresses each exterior spring, and each mechanical stop is located such that it prevents each exterior spring from reaching a solid-length condition.

Thus, in one aspect of the invention, it describes a shock absorber with mechanical stop for torque converter that comprises a drive plate, at least one exterior spring, and a driven plate; the drive plate receives a rotational motion; each exterior spring includes a first end and a second end, the first end makes contact with the drive plate, and the second end that makes contact with the driven plate; and the driven plate receives the rotational motion from the drive plate through each exterior spring, the driven plate is configured to accommodate each exterior spring, and is connected to a drive shaft; wherein the shock absorber is characterized in that the driven plate additionally comprises at least one mechanical stop that is configured to make contact with the drive plate when the drive plate compresses each exterior spring, and each mechanical stop is located such that it prevents each exterior spring from reaching a solid-length condition.

Additionally, in one embodiment of the present invention, the drive plate comprises at least one first retaining element, each first retaining element makes contact with each exterior spring at its first end. Preferably, the drive plate is a friction plate that makes contact with the casing through the clutch to receive the rotational motion of the casing.

In one embodiment of the present invention, the driven plate comprises a piston-side retainer plate, and a retainer plate on the turbine side; the piston-side retainer plate includes at least one mechanical stop and at least one second retaining element, each second retaining element makes contact with each exterior spring at its second end; and the retainer plate on the turbine side which includes a housing and at least a third retaining element, the housing is located along the exterior diameter of the retainer plate on the turbine side and houses each exterior spring, each third retaining element makes contact with each exterior spring at its second end. The housing of the retainer plate on the turbine side is configured to encapsulate and protect each exterior spring. The retainer plates and elements thereof can be interchangeable in location, for example, the retainer plate on the turbine side may include at least one mechanical stop and the piston-side retainer plate may include the housing. Additionally, the driven plate comprises an interior plate which is connected to the retainer plates on the piston side and on the turbine side to the turbine; and the interior plate transmits the rotational motion of the retainer plates and/or of the turbine, such that when the clutch is disengaged the interior plate transmits the rotational motion of the turbine, and when the clutch is engaged the interior plate transmits the rotational motion of the retainer plates.

In another embodiment of the present invention, the shock absorber with mechanical stop may have an initial stage, a compression stage, and a contact stage. In the initial stage, the drive plate through each first retaining element may make contact with each exterior spring at its first end and may in turn make contact with each adjacent exterior spring at its second end; the driven plate through each second retaining element and each third retaining element of the retainer plates on the piston side and on the turbine side, respectively, may make contact with each exterior spring at its first end and may in turn make contact with each adjacent exterior spring at its second end. In the compression stage, the drive plate is angularly displaced in comparison with the initial stage, the drive plate through each first retaining element makes contact with each exterior spring at its first end; the driven plate through each second retaining element and each third retaining element of the retainer plates on the piston side and on the turbine side, respectively, makes contact with the second end of each exterior spring. In the contact stage, the drive plate reaches its maximum angular displacement in comparison with the compression stage, the drive plate through each first retaining element makes contact with each exterior spring at its first end, and makes contact with each mechanical stop of the driven plate, thereby preventing each exterior spring from reaching its solid length; the driven plate through each second retaining element and each third retaining element of the retainer plates on the piston side and on the turbine side, respectively, makes contact with the second end of each exterior spring. Additionally, the housing of the retainer plate on the turbine side is configured to encapsulate the springs and to guide them along the exterior diameter of the retainer plate on the turbine side.

In an additional embodiment of the present invention, the shock absorber comprises between 1 and 10 exterior springs, between 1 and 10 mechanical stops, between 1 and 10 first drive-plate retaining elements, between 1 and 10 second retainer plate retaining elements on the piston side, and between 1 and 10 third retainer-plate retaining elements on the turbine side.

In an alternative embodiment of the present invention, the interior plate of the driven plate comprises at least one housing, and at least one interior spring which includes a first end and a second end; each housing is configured to accommodate each interior spring; the first end of each interior spring makes contact with the retainer plates on the piston side and on the turbine side; and the second end of each interior spring makes contact with the interior plate;

when the driven plate receives rotational motion, each interior spring is compressed by the retainer plates on the piston side and on the turbine side and by transferring the rotational motion to the interior plate, wherein each mechanical stop is so located as to prevent each exterior spring and each interior spring from reaching its solid-length condition.

Referring now to FIGS. 1A to 1E, these illustrate different configurations for each exterior spring 1620' and/or interior spring 1623' of the shock absorber 1600' of the state of the art.

FIG. 2, shows a shock absorber 1600' of the state of the art which comprises an impulse plate 1510', a piston-side plate 1640', a turbine-side plate 1650', and at least one exterior spring 1620', wherein the piston-side plate 1640' around its exterior perimeter has no element to limit the compression of each exterior spring 1620'.

Figure 3:
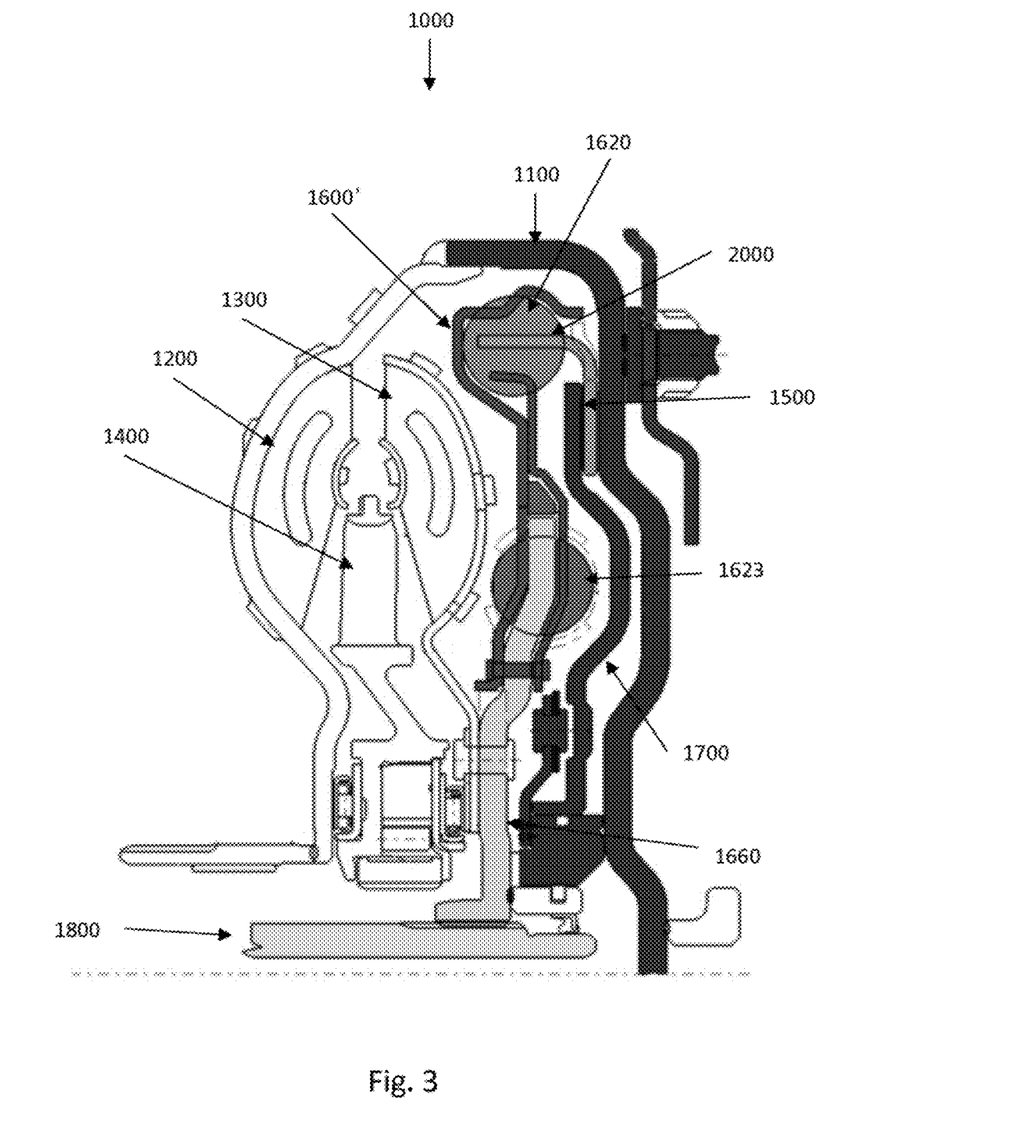
FIG. 3 shows a cross-sectional view along an axis of the torque converter in accordance with a first embodiment of the present invention.

Now, FIG. 3 shows a torque converter 1000 which comprises a casing 1100, a pump 1200, a turbine 1300, a stator 1400, a clutch 1500, a shock absorber 1600', a friction disk 2000, and a piston 1700, among other things; wherein, the casing 1100 receives rotational motion from the engine (not shown), the casing 1100 is assembled directly with the pump 1200; the pump 1200 receives rotational motion from the casing 1100 and is configured to transfer this rotational motion to the turbine 1300 by means of a working fluid; the turbine 1300 transfers the rotational motion to the drive shaft 1800 directly, the vibrations generated by the engine are dissipated by the hydraulic coupling between the pump 1200 and the turbine 1300; the shock absorber 1600' is configured to transfer the rotational motion to a transmission of the vehicle 1800; the clutch 1500 is configured to allow direct coupling between the casing 1100 and the shock absorber 1600' when the pump 1200 and the turbine 1300 reach similar speeds, which causes a cessation in torque amplification, the clutch 1500 can be activated by the axial movement of the piston 1700; the friction disk 2000 transmits the rotational motion to the exterior springs 1620 by mechanical contact; and the piston 1700 is displaced axially by means of a pressure difference in the working fluid of the torque converter 1000 or by changing the direction of flow of the working fluid, this axial displacement permits the activation of the clutch 1500.

Figure 4A:
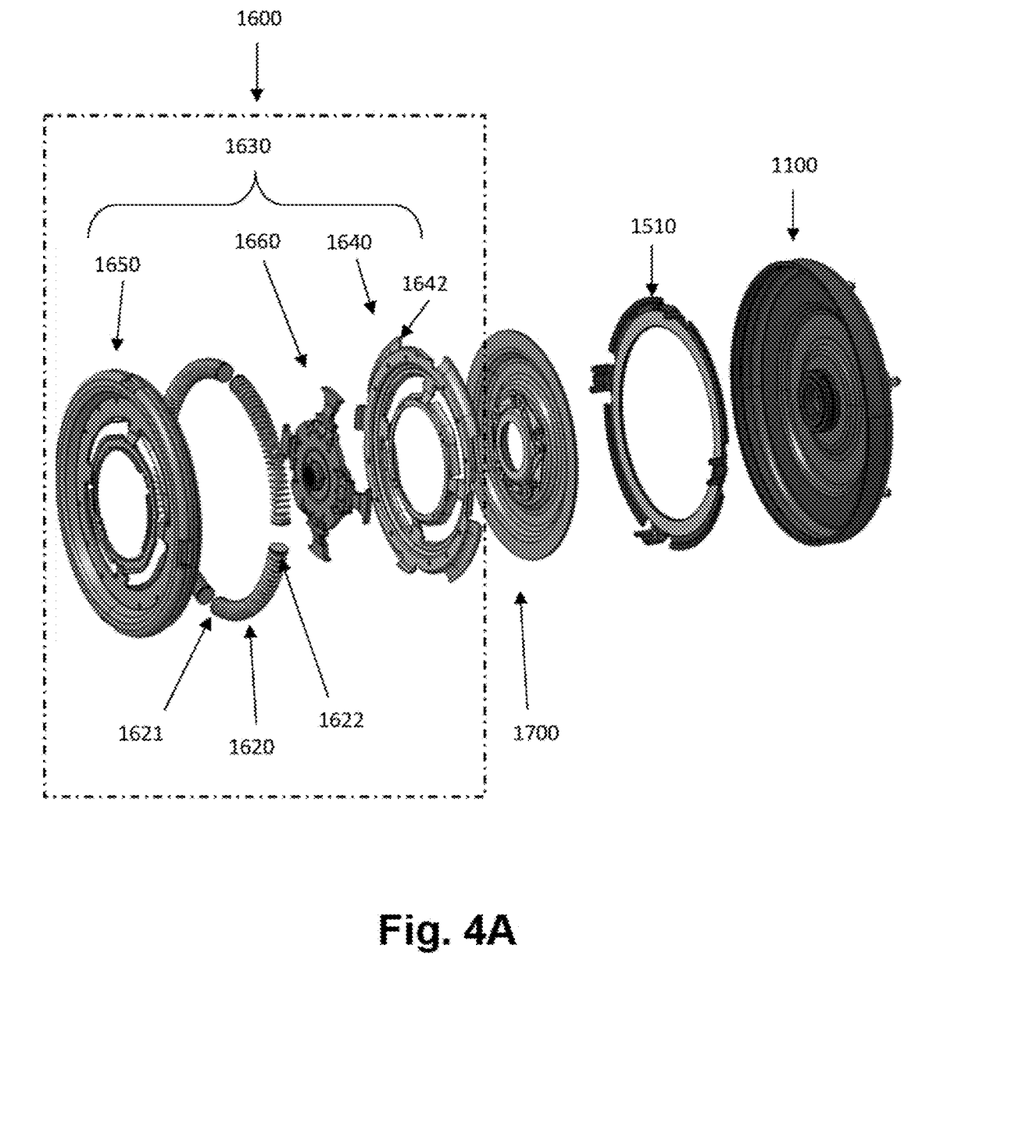
FIG. 4A shows a right front perspective view of an exploded view of the shock absorber in accordance with a first embodiment of the present invention.

Referring now to FIG. 4A, which shows one embodiment of the present invention, wherein a shock absorber with mechanical stop 1600 for torque converter comprises a drive plate 1510, at least one exterior spring 1620, and a driven plate 1630; the drive plate 1510 receives a rotational motion; each exterior spring 1620 includes a first end 1621 and a second end 1622, the first end makes contact with the drive plate 1510 and the second end 1622 makes contact with the driven plate 1630; and the driven plate 1630 which receives the rotational motion from the drive plate 1510 through each exterior spring 1620, the driven plate 1630 is configured to accommodate each exterior spring 1620, and is connected to a drive shaft (not shown); wherein the shock absorber with mechanical stop 1600 is characterized in that the driven plate 1630 additionally comprises at least one mechanical stop 1642 that is configured to make contact with the drive plate 1510 when the drive plate 1510 compresses each exterior spring 1620, and each mechanical stop 1642 is located such that it prevents each exterior spring 1620 from reaching a solid-length condition.

Additionally, FIG. 4A shows that the driven plate 1630 may comprise an interior plate 1660 that is connected to some retainer plates on the piston side 1640 and on the turbine side 1650 and to the turbine (not shown), such that when the clutch is disengaged, the interior plate 1660 transmits the rotational motion of the turbine and when the clutch is engaged, the interior plate 1660 transmits the rotational motion of the retainer plates on the piston side 1640 and on the turbine side 1650.

Figure 4B:
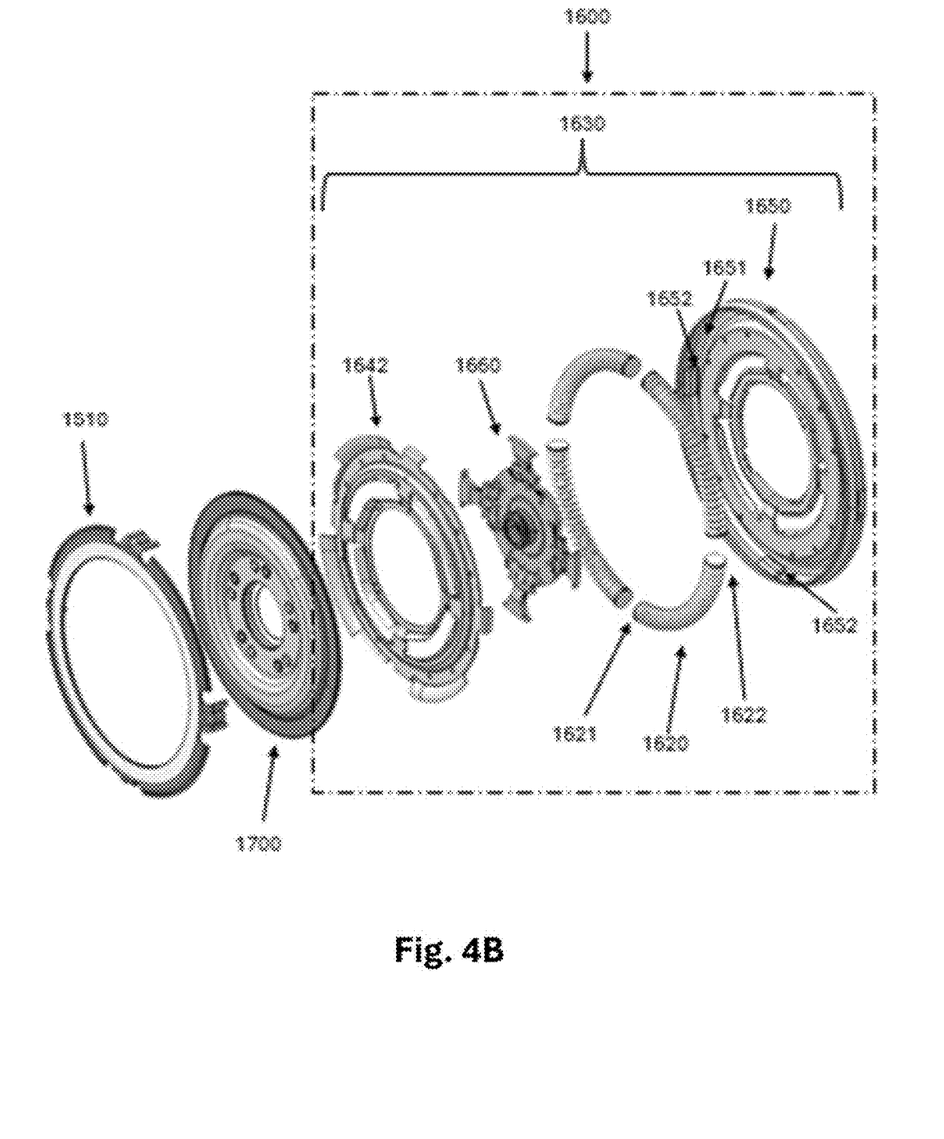
FIG. 4B shows a left rear perspective view of an exploded view of the shock absorber in accordance with a first embodiment of the present invention.

Referring now to FIG. 4B, it shows a rear view of the shock absorber illustrated in the FIG. 4A, and therein the housing 1651 and the third retainer element 1652 of the retainer plate on the turbine side 1650 are observed.

Figure 5A:
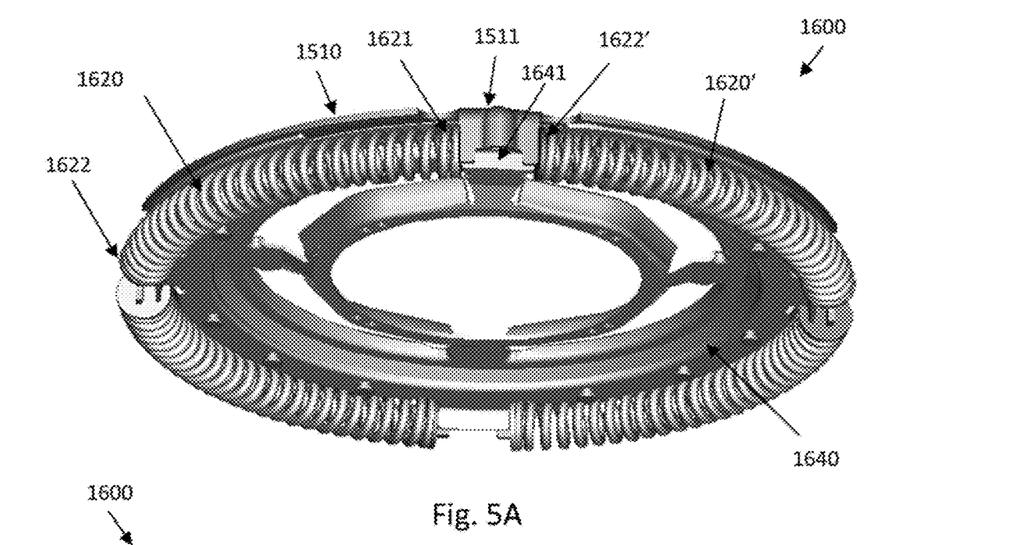
FIG. 5A shows a top front perspective view of the shock absorber in an initial stage.

FIG. 5a shows an additional embodiment of the present invention, wherein the shock absorber with mechanical stop 1600 is in an initial stage, wherein the drive plate 1510 through each first retaining element 1511 may make contact with each exterior spring 1620 at its first end 1621 and may in turn make contact with each adjacent exterior spring 1620 at its second end 1622; the driven plate through each second retaining element 1641 and each third retaining element (1652, FIG. 4B) of the retainer plates on the piston side 1640 and on the turbine side (1650, FIG. 4B) respectively may contact each exterior spring 1620 at its first end 1621 and may in turn make contact with each adjacent exterior spring 1620 at its second end 1622.

Figure 5B:
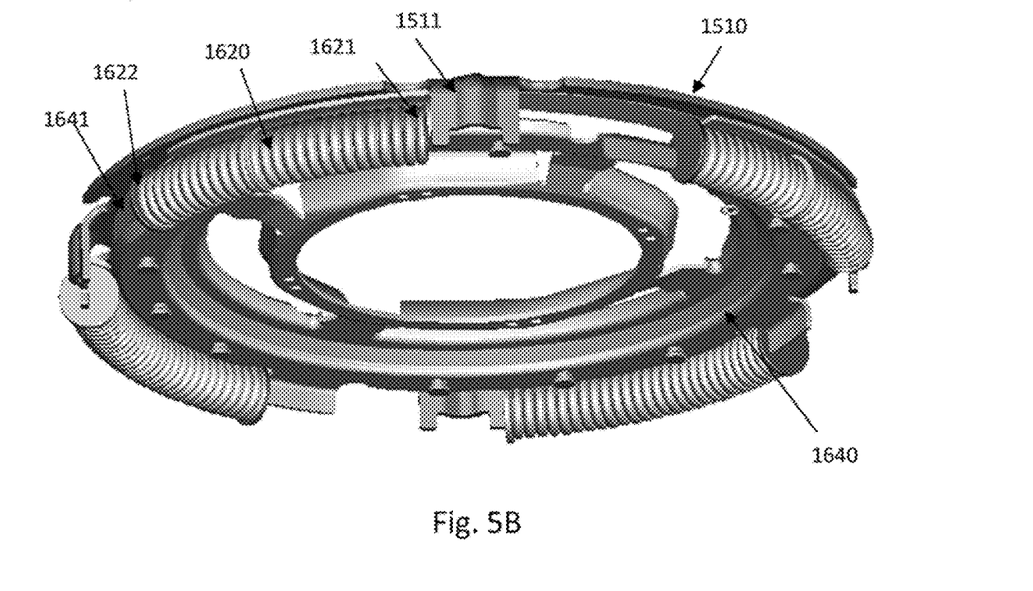
FIG. 5B shows a top front perspective view of the shock absorber in a compression stage.

Additionally, FIG. 5b shows the shock absorber with mechanical stop 1600 in a compression stage, wherein the drive plate 1510 is displaced angularly in comparison with the initial stage of FIG. 5a, the drive plate 1510 through each first retaining element 1511 makes contact with each exterior spring 1620 at its first end 1621 and in turn its angular path is limited by the retainer plate 1640 by its mechanical stop 1642 belonging to the same profile; the driven plate by means of each second retaining element 1641 and each third retaining element (1652, FIG. 4B) of the retainer plates on the piston side 1640 and on the turbine side (not shown) respectively makes contact with the second end 1622 of each exterior spring 1620.

Figure 7:
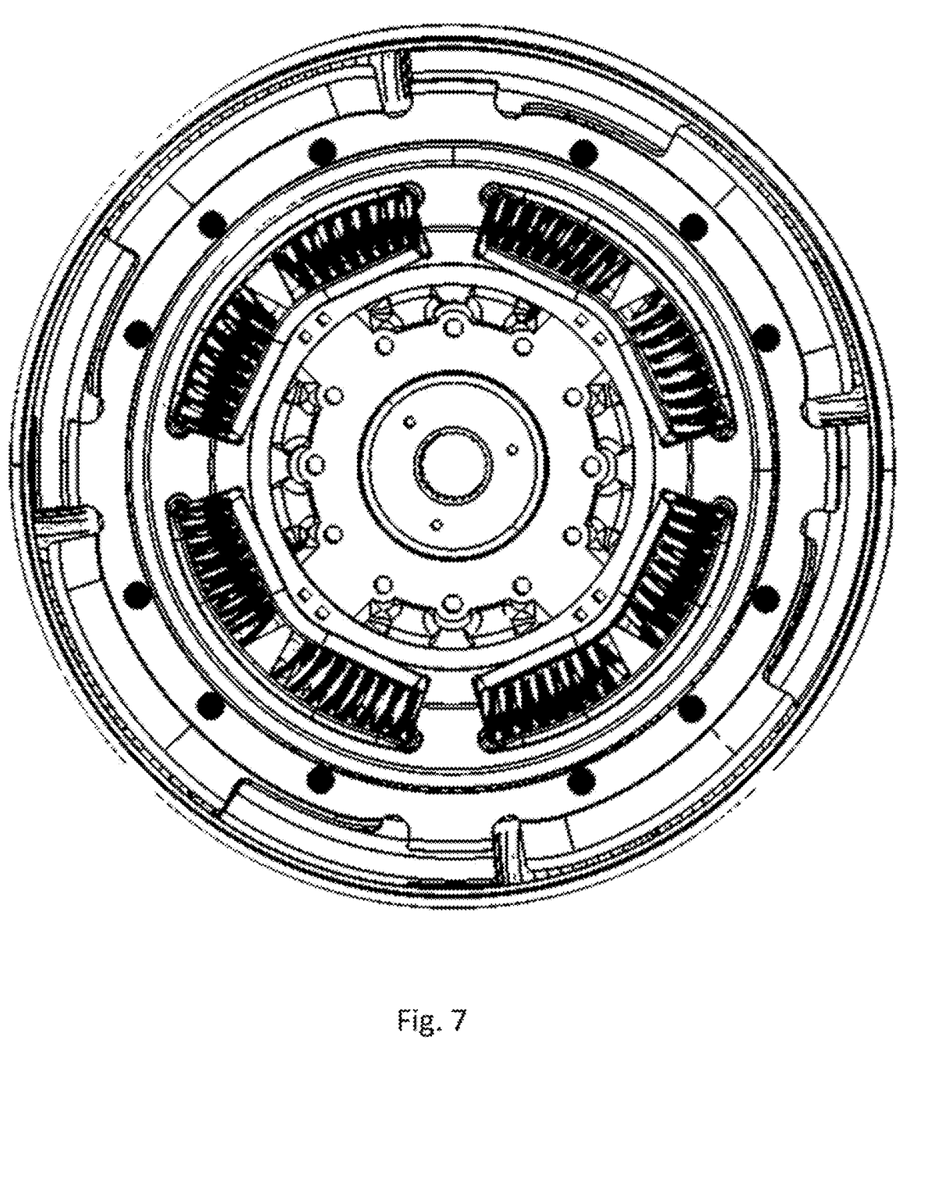
FIG. 7 shows a front elevation view of the shock absorber wherein the system is subjected to torque and rotational motion.
Figure 8:
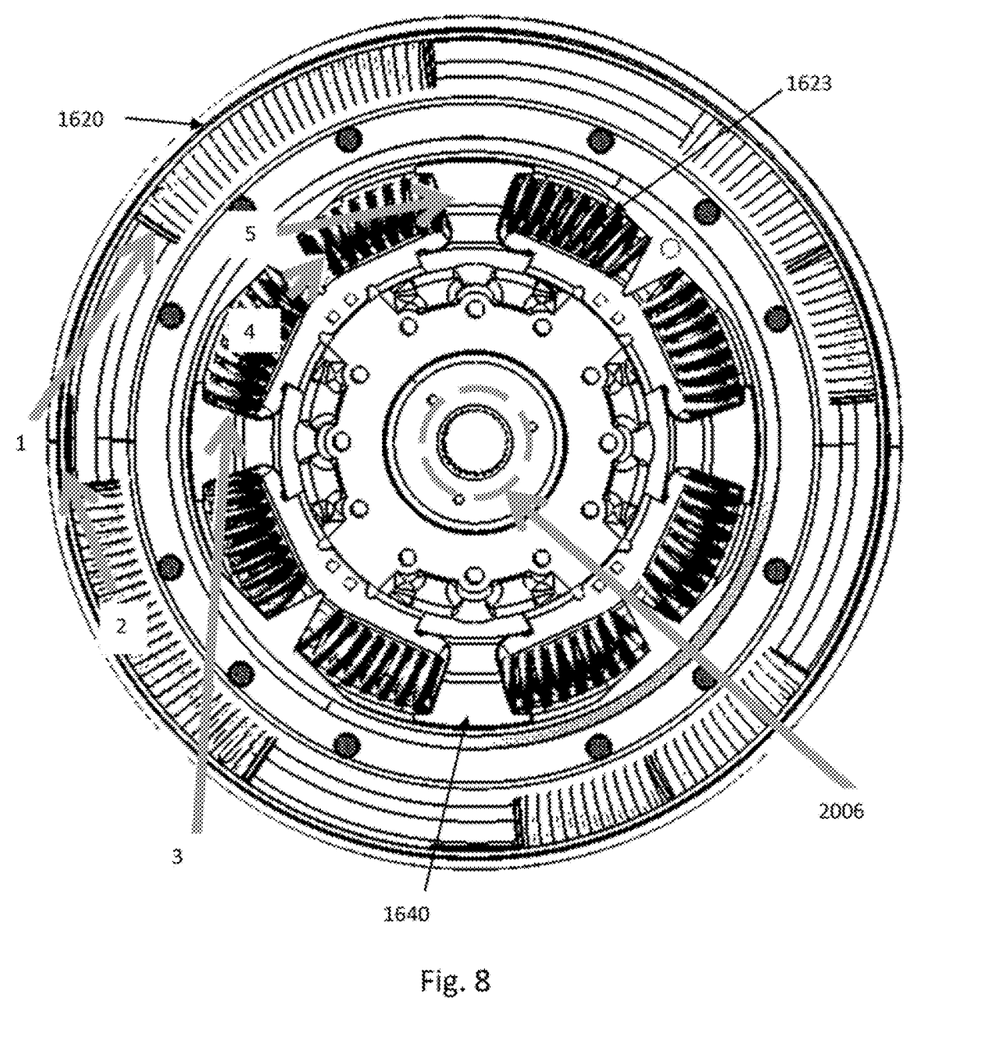
FIG. 8 shows the compression process in sequence for the spring shock absorber, starting from the exterior part (with the bow springs which are the first to be compressed and these in turn move rotationally the retainer plates which in turn compress the internal springs (straight springs) which finally transmit the rotational motion to the component that makes the interface with the drive shaft.

FIGS. 7 and 8 illustrate one embodiment of the invention where FIG. 7 shows the configuration of the system subjected to torque and rotational motion and FIG. 8 shows that once the torque is applied, the compression of the springs generates the next cycle:

1.—The exterior springs 1620 compressed, push the retainer plate 1640 and its corresponding counterpart 1650.
2.—The rigidly assembled plates push together with the retaining element 1641 on the interior springs 1623.
3.—The retaining element 1641 pushes the interior plate 1660 which connects both springs.
4.—The interior plate 1660 pushes the interior spring 1623.
5.—The interior spring 1623 pushes the interior plate 1660.
6.—The area marked in dotted lines 2006 is the connection interface that connects to the drive shafts.

The present invention will be better understood from the following examples, which are presented solely for illustration purposes to permit a thorough understanding of the preferred embodiments of the present invention, without thereby implying that there are not other embodiments not shown that might be put into practice based on the detailed description given above.

EXAMPLES

Example 1

Figure 6:
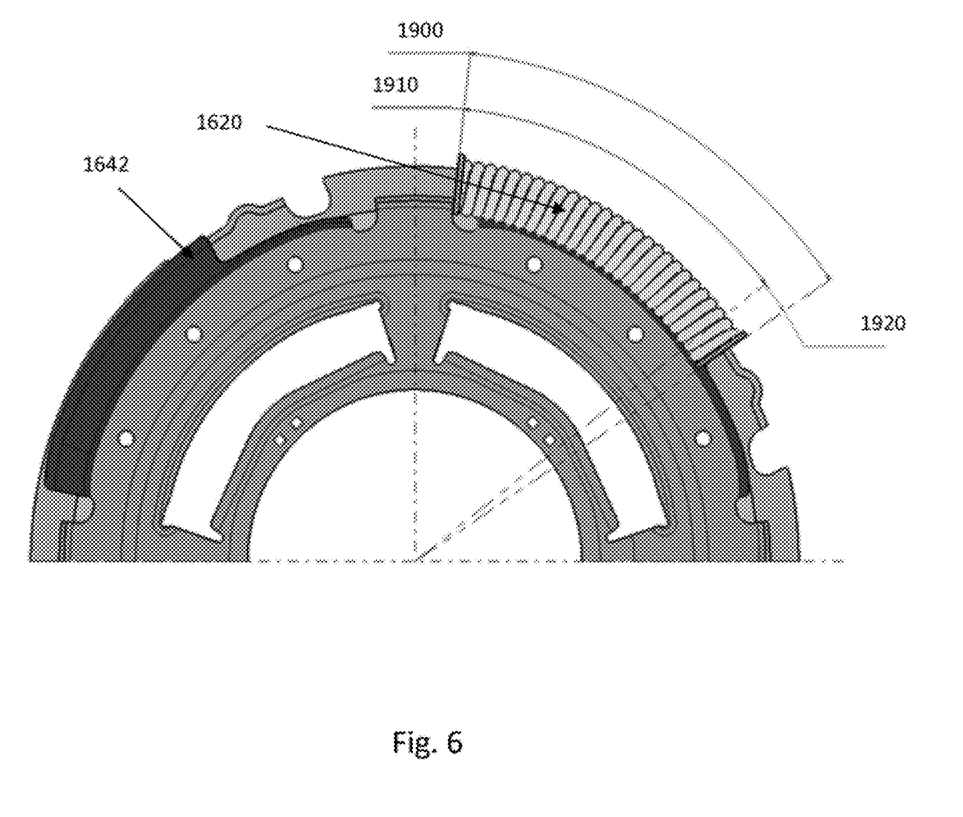
FIG. 6 shows a front elevation view of the shock absorber showing the angles considered for calculating a stop angle that must encompass at least one mechanical stop.

Various calculations were done to determine a stop angle 1900 that at least one mechanical stop 1642 must span so that it will prevent each exterior spring 1620 from reaching its solid length. As shown in FIG. 6, the exterior spring 1620 reaches its solid length at a solid angle 1910 of 52.18°, therefore, the stop angle 1900 comprises the sum of the solid angle 1910 and a safety angle 1920 of 4.2°, the stop angle 1900 being 56.6°.

Example 2

Figure 9:
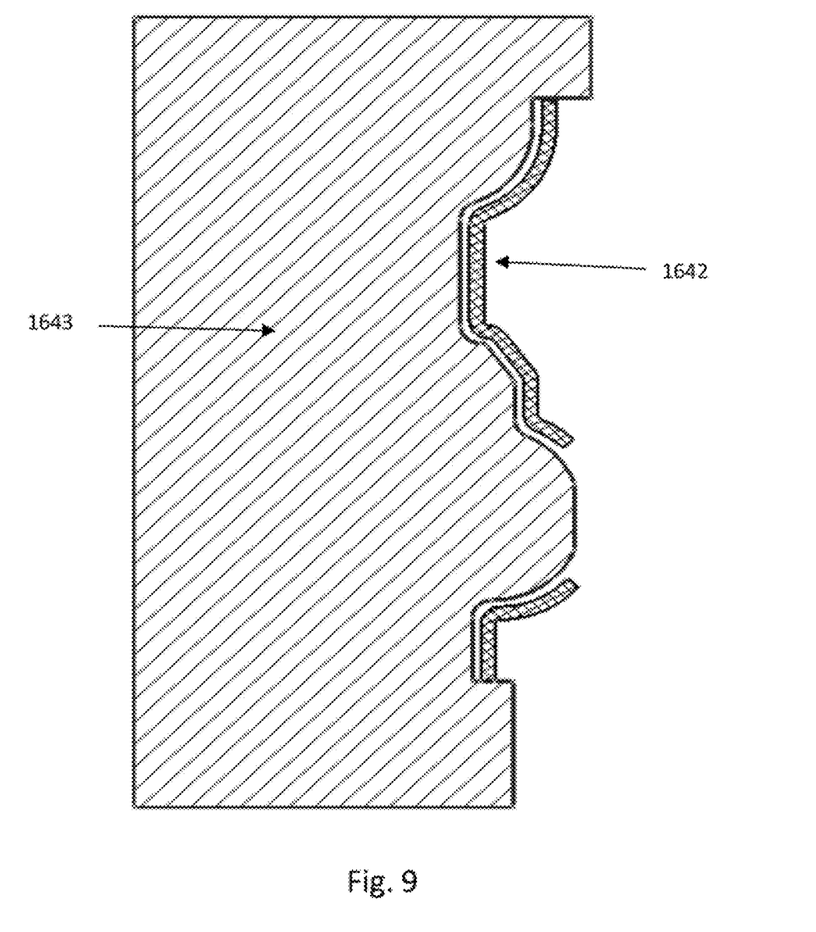
FIG. 9 shows a front elevation view of the retainer plate of the side of a piston being formed by a stamping process.

The design of the mechanical stop 1642 of the piston-side retainer plate 1640 considers not requiring additional manufacturing processes. As shown in FIG. 9, the mechanical stop 1642 is generated in the same stamping process as the other elements of the retainer plate on the piston side 1640. The stamping tool 1643 is shown in FIG. 9.

In accordance with what is described above, it can be seen that a shock absorber with mechanical stop for torque converter has been devised to have a simplified manufacturing process and also to prevent the exterior springs from reaching their solid length, and it will be evident to anyone skilled in the art that the embodiments of the shock absorber with mechanical stop for torque converter as described above and shown in the accompanying drawings are only illustrative and not restrictive of the present invention, since numerous changes of consideration in its details are possible without departing from the scope of the invention. For example, the turbine may be connected to different elements of the shock absorber to transmit the rotational motion.

Therefore, the present invention must not be considered as restricted except as required by the prior art and by the scope of the appended claims.

The invention claimed is:

1. A shock absorber with mechanical stop for torque converter comprising:
    a drive plate that receives a rotational motion;
    at least one exterior spring, wherein each exterior spring includes a first end that makes contact with the drive plate and a second end that makes contact with a driven plate; and
    the driven plate that receives the rotational motion of the drive plate through each exterior spring,
    wherein the driven plate comprises retaining elements that correspond to each exterior spring,
    where the driven plate is connected to a drive shaft,
    wherein the driven plate additionally comprises:
        at least one mechanical stop configured to make direct contact with the drive plate when the drive plate compresses each exterior spring, and each mechanical stop prevents each exterior spring from reaching a solid-length condition by stopping compression of the spring before reaching its solid length; and
    a retainer plate on the piston side, and a retainer plate on the turbine side,
    wherein the retainer plate on the piston side includes a mechanical stop of the at least one mechanical stop and at least one second retaining element,
    wherein each second retaining element makes contact with each exterior spring at its second end,
    wherein the retainer plate on the turbine side includes a housing and at least a third retaining element,
    wherein the housing is located along the exterior diameter of the retainer plate on the turbine side and accommodates each exterior spring, and
    wherein each third retaining element makes contact with each exterior spring at its second end.

2. The shock absorber with mechanical stop according to claim 1 wherein the drive plate comprises at least one first retaining element, wherein each first retaining element makes contact with each exterior spring at its first end.

3. The shock absorber with mechanical stop according to claim 1 wherein the drive plate is a friction plate which makes contact with a casing by means of a clutch to receive the rotational motion of the casing.

4. The shock absorber with mechanical stop according to claim 1 wherein the housing of the retainer plate on the turbine side encapsulates and protects each exterior spring.

5. The shock absorber with mechanical stop according to claim 1 wherein the at least one mechanical stop and the at least one second retaining element of the retainer plate on the piston side can interchange its locations to be included in the retainer plate on the turbine side, and
    the housing and the third retaining element of the retainer plate on the turbine side can interchange its locations to be included in the retainer plate on the piston.

6. The shock absorber with mechanical stop according to claim 1 wherein the driven plate comprises an interior plate which is connected to the retainer plates on the piston side and to the turbine on the turbine side; and wherein:
    when a clutch is engaged, the interior plate transmits the rotational motion of the retainer plates; and
    when the clutch is disengaged, the interior plate transmits the rotational motion of the turbine.

* * * * *